United States Patent
Ward et al.

(10) Patent No.: US 9,577,287 B2
(45) Date of Patent: Feb. 21, 2017

(54) GALVANIC CELLS AND COMPONENTS THEREFOR

(71) Applicant: University of Leeds, Yorkshire (GB)

(72) Inventors: Ian Ward, Yorkshire (GB); Hugh Hubbard, Yorkshire (GB); Simon Charles Wellings, Yorkshire (GB); Jerry Barker, Oxfordshire (GB)

(73) Assignee: UNIVERSITY OF LEEDS (GB)

( * ) Notice: Subject to any disclaimer, the term of this patent is extended or adjusted under 35 U.S.C. 154(b) by 344 days.

(21) Appl. No.: 14/363,737

(22) PCT Filed: Dec. 7, 2012

(86) PCT No.: PCT/GB2012/053049
§ 371 (c)(1),
(2) Date: Jun. 6, 2014

(87) PCT Pub. No.: WO2013/083998
PCT Pub. Date: Jun. 13, 2013

(65) Prior Publication Data
US 2014/0349196 A1 Nov. 27, 2014

(30) Foreign Application Priority Data
Dec. 9, 2011 (GB) .................................. 1121170.3

(51) Int. Cl.
*H01M 10/0565* (2010.01)
*H01M 4/04* (2006.01)
(Continued)

(52) U.S. Cl.
CPC .......... *H01M 10/0565* (2013.01); *H01M 4/04* (2013.01); *H01M 4/043* (2013.01);
(Continued)

(58) Field of Classification Search
CPC H01M 10/0565; H01M 4/04; H01M 10/0525; H01M 10/0481
(Continued)

(56) References Cited

U.S. PATENT DOCUMENTS 5,849,433 A 12/1998 Venugopal et al.
2002/0192549 A1* 12/2002 Maruyama ............ H01M 2/145
429/217
(Continued)

OTHER PUBLICATIONS

International Search Report and Written Opinion for PCT/GB2012/053049 dated Apr. 29, 2013.
(Continued)

*Primary Examiner* — Basia Ridley
*Assistant Examiner* — James Erwin
(74) *Attorney, Agent, or Firm* — MH2 Technology Law Group LLP (57) ABSTRACT

The present invention provides an electrolyte component containing one or more salts including lithium bis(oxalate) borate (LiBOB), a solvent, propylene carbonate (PC) and a crystallizable polymer wherein said LiBOB is present as a weight percentage of 0.5% or more, said propylene carbonate is present as a weight percentage of between 5% and 90% and the crystallizable polymer is present at a weight percentage of greater than 1%. It also provides a galvanic cell formed from the above and a process for forming same.

12 Claims, 3 Drawing Sheets

(51) Int. Cl.
  *H01M 10/0525* (2010.01)
  *H01M 10/04* (2006.01)
(52) U.S. Cl.
  CPC ..... *H01M 4/0411* (2013.01); *H01M 10/0481* (2013.01); *H01M 10/0525* (2013.01); *H01M 2300/0085* (2013.01); *Y02E 60/122* (2013.01); *Y10T 29/49115* (2015.01)
(58) Field of Classification Search
  USPC .......................................... 429/307; 29/623.5
  See application file for complete search history.

(56) References Cited

U.S. PATENT DOCUMENTS

| | | |
|---|---|---|
| 2006/0032045 A1 | 2/2006 | Naarmann et al. |
| 2008/0076030 A1 | 3/2008 | Inagaki et al. |
| 2009/0253046 A1* | 10/2009 | Smart ............... H01M 10/0568 429/326 |
| 2011/0143212 A1* | 6/2011 | Angell .............. H01M 10/0567 429/307 |

OTHER PUBLICATIONS

Zhang, et al., "LiBOB-based gel electrolyte Li-ion battery for high temperature operation", Journal of Power Sources, vol. 154, No. 1, Mar. 9, 2006, pp. 276-280.
International Preliminary Report on Patentability for PCT/GB2012/053049 dated Jun. 19, 2014.

* cited by examiner

GALVANIC CELLS AND COMPONENTS THEREFOR

The present invention relates to galvanic cells and components therefor including electrolytes, electrodes and gel separators and relates particularly but not exclusively to such combinations thereof when employing a gel type electrode separator.

BACKGROUND OF THE INVENTION

The most commonly used electrolytes are fluid liquids which comprise solutions in a liquid solvent of solute ionic species. Such fluid liquid electrolytes, on incorporation into a galvanic cell, permit migration of ions between the electrodes of the cell and, as a consequence, the provision of electric energy to a closed external circuit. Despite their widespread use, such electrolytes nonetheless suffer from several disadvantages. They are often corrosive, leading to leakage from cells and they do not provide a firm barrier between the electrodes when required to assist in stabilizing the inter-electrode distance and in preventing physical loss of electrode material from the electrode surface.

In order, in part, to overcome the disadvantages inherent in fluid liquid electrolytes, particularly in relation to galvanic cells, considerable effort has been expended in attempts to provide solid or highly viscous polymeric electrolytes which contain salts which display mobility, under appropriate conditions, of at least some of the ionic species present. The solid polymeric electrolytes are capable of acting in thin film form as electrode separators and in solid-state cells can deform while maintaining good contact with the electrodes, thus minimizing problems arising from mechanical strain arising either from mechanical stresses during use or volume changes during the charge/discharge cycle. A particular area of importance is in cells that do not depend upon water as a component of the electrolyte, such as lithium cells where water and other materials capable of reacting with lithium are undesirable. The potential uses for such materials are not limited to batteries but include, inter alia, sensor devices and thermoelectric energy convectors.

A prominent polymeric material for this purpose has been poly(ethylene oxide) (PEO), in which certain salts are soluble and can form complexes. The electrical and mechanical properties of such polymer electrolyte materials, although encouraging, require further enhancement before commercialisation can be envisaged. Improvements in the properties have been obtained using graft copolymers in which short poly(ethylene oxide) chains are present as pendant units attached to a long main chain. Such materials have been described In GB-A-2161488. Another means of improving the mechanical properties is to use block copolymers in which short poly(ethylene oxide) chains alternate with other units such as polysiloxane. Yet another means is to cross-link a poly(ethylene oxide) with an epoxy compound. In each case the polymer electrolyte contains a suitable salt complexed with the polymer to provide the ionic species required for conductivity. In all these cases the conductivities reported at 25° C. or at room temperature are at best about $10^{-4}$ Siemens per cm. These values are an order of magnitude less than a commonly cited target for commercial realization of $10^{-3}$ Siemens per cm.

It is also possible to provide polymer electrolytes which consist of a mixture of a polymer, preferably of high molecular weight, with a compound of low molecular weight that is a solvent for the polymer in the range of temperatures in which the electrolyte is to be used, together with an appropriate salt that is soluble in the polymer and in the compound of low molecular weight. For example, as disclosed in GB-A-2212504 and 2216132, polymer electrolytes consisting of poly-N,N-dimethylacrylamide or closely related poly-N-substituted acrylamide of high molecular weight plasticized with dimethylacetamide together with lithium trifluoromethane sulphonate (lithium triflate) as the salt component have been evaluated and found to exhibit good conductivities together with good mechanical properties. These polymer electrolytes are gel-like in character, but the compound of low molecular weight must not exceed a certain limiting concentration above which the system loses its gel-like character and begins to flow. The ionic conductivity is higher at the higher concentrations of the compound of low molecular weight, but the material becomes increasingly more flexible. Conductivities of $7 \times 10^{-3}$ S cm$^1$ at 20° C. are obtainable but this requires at least 60% or more of the low molecular weight compound and at this level the mechanical properties are poor. It has proved possible by cross-linking the polymer to improve the mechanical properties to a useful level with as much as 80% of the low molecular weight compound present, and thus to obtain conductivities at 20° C. exceeding $10^{-3}$ Scm$^1$. These products may prove of commercial interest, but the process for making the cross-linked polymer electrolyte film is somewhat complex for convenient incorporation into a process for cell manufacture.

However it is well established that with electrolytes containing propylene carbonate (PC) as the liquid component in whole or in part, for most anode electrode systems, particularly those comprising graphite, exfoliation of the electrode occurs. This exfoliation continues throughout the charge-discharge process, resulting in extensive capacity loss on the first cycle and progressive capacity loss in subsequent cycles. For liquid cells the industry therefore favours a combination of aprotic organic solvents other than PC, eg. EC, DEE, EMC etc. many of which are much more volatile than PC. These can be used in cell manufacture which takes place at ambient temperatures.

The use of volatile organic liquids is generally problematic for the formation of polymer gel electrolytes (PGE) by extrusion lamination at high temperatures. High boiling point solvents such as ethylene carbonate (EC) (bp 244° C.) and PC (bp 240° C.) are required in the major proportion for the formation of the PGEs. But EC has a high melting point (36° C.) and a non-trivial proportion of PC (mp −55° C.) is required to prevent the gel from freezing at ambient temperatures. EC and PC are benign non-toxic materials which are easy to handle. Other higher boiling point solvents from which PGEs could be formed (eg. Dimethyl formamide (DMF) or NMP) are more hazardous and often toxic. Gels composed of EC and more volatile components are generally of poorer quality mechanically than those with substantial quantities of PC. PGEs formed with PC either alone or in conjunction with EC are of the highest quality.

Thus at present there is a balance to be obtained between the aprotic solvents used, their ratio and the choice of anode composition and construction.

There are anode compositions incorporating different forms of graphite which can be used with PC with minimal exfoliation and capacity loss, but their use is restrictive. Hitherto there has not been an effective additive agent in surpressing this exfoliation and loss of capacity. Such an agent, working on all graphitic anodic materials would greatly enhance the PGE extrusion-lamination process with the unrestricted use of PC.

More recently a new lithium salt, lithium bis(oxalate) borate (LiBOB) has become available and has been proposed for use with graphitic anodes. By the addition of LiBOB at as low as 5% molar, exfoliation in the graphitic anode has been shown to be effectively prevented.

It is now proposed that the addition of LiBOB to the polymer gel electrolyte itself, generally in conjunction with the extrusion lamination procedure, will greatly extend the range of materials available for the fabrication of electrical components (particularly galvanic cells) and greatly enhance the performance of these components.

BRIEF DESCRIPTION OF THE INVENTION

Accordingly, the present invention provides an electrolyte component containing one or more salts including lithium bis(oxalate)borate (LiBOB), a solvent, propylene carbonate (PC) and a crystallisable polymer wherein said LiBOB is present as a weight percentage of 0.5% or more, said propylene carbonate is present as a weight percentage of between 5% and 90% and the crystallisable polymer is present at a weight percentage of greater than 1%.

Preferably the component includes a second salt as a major component of a salt portion and LiBOB as a minor portion thereof. The solvent may comprise ethylene carbonate (EC).

Advantageously, the component has the following composition: EC:PC (2:1;w:w), LiBOB (1.0M).

In a preferred arrangement the component comprises a mixed LiBOB, LiBF$_4$ mixed salt liquid electrolyte having the following composition: EC:PC (2:1;w:w), LiBOB (0.5M), LiBF$_4$ (0.5M). It may further comprise a polyvinylidene fluoride (PVDF), solvent, LiBOB. Preferably, the PVDF is Solvay Solexis PVDF 1015.

Advantageously, the composition comprises: up to 30% PVDF: up to 70% (EC:PC (2:1;w:w), LiBOB (0.5M), LiBF$_4$ (0.5M)). Preferably, the composition comprises: up to 30% PVDF: up to 70% (EC:PC (2:1;w:w), LiBOB (0.05M), LiBF$_4$ (0.95M)).

The organic solvent may be selected from the group consisting of propylene carbonate (PC), ethylene carbonate (EC), dimethyl carbonate (DMC), ethyl methyl carbonate (EMC), diethylcarbonate (DEC), dimethoxyethane (DME), diethoxyethane (DEE), N-methylpyrrolidone (NMP), γ-butyrolactone (GBL), tetra(ethyleneglycol)dimethylether [tetraglyme], tri(ethyleneglycol)dimethylether[triglyme], N,N-dimethyl formamide (DMF), N,N-dimethyl acetamide (DMA), dimethylsulfoxide (DMSO), tetrahydrofuran (THF), acetonitrile.

In some arrangements the component may include a ceramic filler within the polymer component. It may also include a non-crystallisable polymer such as Poly(methyl methacrylate) (PMMA). Preferably, the component comprises two or more crystallisable polymers.

The anion may be selected from the group consisting of SCN$^-$, ClO$_4^-$, HgI$_3^-$, BF$_4^-$, CF$_3$COO$^-$, CF3 SO$_3^-$, PF$_6^-$, As F$_6^-$, [N(SO$_2$CF$_3$)$_2$]$^-$, [N(SO$_2$CF$_2$CF$_3$)$_2$.

The present invention also includes a galvanic cell having an electrolyte component as described above.

Preferably, the cell comprises an anode and a cathode and having an electrolyte component as described above.

Advantageously, the cell includes an anode and a cathode, said anode comprising graphite, hard carbon, silicon, tin, tin alloys, tin oxide, nanocomposites, lithium metal or lithium metal alloy. Preferably, the cell comprises an anode and a cathode, said anode comprising MCMB graphite, carbon and PVDF binder. In some arrangements the cellan anode and a cathode, said anode comprising at least 80% of MCMB graphite, at least 9% of SFG44 carbon and at least 3% of 6020 PVDF.

Advantageously, the galvanic cell comprises a cathode comprising layered oxides, lithium metal oxides, LiMO$_2$ (M=Co, Ni, Mn), LiMn$_2$O$_4$, lithium metal phosphates, LiFePO$_4$, Li$_3$M$_2$(PO$_4$)$_3$, LiVPO$_4$F, or lithium metal sulphates, LiFeSO$_4$F, LiMnSO$_4$F, Li$_2$FeSiO$_4$, Li$_2$MnSiO$_4$. It may further comprise a cathode comprising lithium cobalt oxide, Denka (carbon) Black and PVDF binder. Preferably, it comprises a cathode comprising lithium cobaltous oxide, at least 2.5% of Denka Black and at least 2.5% of Solvay PVDF 6020

According to another aspect of the present invention there is provided a method of producing a laminated electrical component as described above comprising the steps of:
  i) mixing and heating polymer/s, solvent/s in a mixing apparatus to form a homogeneous melt material
  ii) forming the melt material as an elongated tape of desired width and depth
  iii) contacting the tape from step (ii) with an electrode material at a temperature at which the tape, at least at the contact surface, is in the liquid phase;
  iv) simultaneously or sequentially with step (iii) compressing the electrode material and mixture whereby an elongated laminated composite is formed; and
  v) adding a salt to the material either during the or subsequent to step (i).

An alternative method of producing a laminated electrical component as described above comprises the steps of:
  a. mixing and heating polymer/s, solvent/s in a mixing apparatus to form a homogeneous melt material
  b. extruding said material through an orifice of defined width and depth in the liquid phase such as to produce a thin film extrudate;
  c. contacting the said extrudate material in the liquid phase with an electrode material layer to produce a laminated composite comprising electrode and mixture layers;
  d. compressing the laminated composite formed in (iii) while the mixture is still in the liquid phase whereby an elongated laminated composite of defined thickness is produced;
  e. causing the laminate to cool such that the mixture is converted to a solid gel; and
  f. adding a salt to the material either during the or subsequent to step (a).

A still further method of producing a laminated electrical component as described above and having an anode and a cathode comprises the steps of:
  a. Mixing and heating polymer/s (including Solvay PVDF 1015), solvent/s including PC, in a twin screw mixing apparatus to form a homogeneous melt material
  b. extruding said material via a single screw extruder through an orifice (die) of defined width and depth in the liquid phase such as to produce a thin film extrudate;
  c. contacting the said extrudate material in the liquid phase with an electrode material layer;
  d. compressing said extrudate between an anode and a cathode whereby an elongated laminated composite of defined thickness is produced;
  e. causing the laminate to cool such that the mixture is converted to a solid gel; and
  f. adding a salt to the material either during step (a) or subsequently, said salt including LiBOB.

The method may include the steps of having a graphitic anode and a lithium cobaltous oxide cathode and homogeneous melt material prepared from 30% Solvay PVDF 1015, 70% (EC:PC (2:1;w:w), LiBOB (0.5M), LiBF$_4$ (0.5M)) In one arrangement in which prior to contact of the mixture, whether in liquid or gel form, with the electrode material, an aprotic organic liquid is applied to one or more of the surfaces to be contacted. Alternatively, prior to contact of the mixture, whether in liquid or gel form, with the electrode material, an electrolyte solution including LiBOB is applied to one or more of the surfaces to be contacted.

Advantageously, the homogeneous melt material is formed from polymer and solvent without salt and that prior to contact of the mixture, whether in liquid or gel form, with the electrode material, an electrolyte solution including LiBOB is applied to one or more of the surfaces to be contacted.

The method may include, prior to contact of the mixture, whether in liquid or gel form, with the electrode material, an electrolyte solution including LiPF$_6$ is applied to one or more of the surfaces to be contacted.

BRIEF DESCRIPTION OF THE DRAWING

The invention will now be described with reference to the accompanying drawings, in which.

DETAILED DESCRIPTION OF THE PRESENT INVENTION

Figure 1:
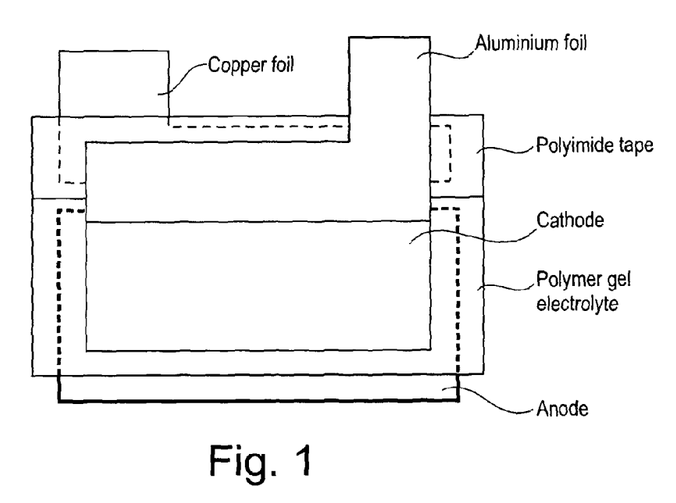
FIG. 1 is a schematic representation of a battery cell in accordance with aspects of the present invention.

Polymer gel electrolyte components containing PC and LiBOB are here generally prepared via a twin screw extruder, laminated between electrodes and prepared, tabbed and packaged as shown in FIG. 1.

The entire process is described below: from the composition of the materials used; the extrusion lamination apparatus; the preparation of materials and equipment; the extrusion lamination process; cell handling, tagging and packaging; through to the testing of the cells.

(1) Composition of Materials (a) Composition of Liquids

A typical liquid electrolyte with single salt LiBF$_4$ has the following composition: EC:PC (2:1;w:w), LiBF$_4$ (1.0M)

A LiBOB, LiBF$_4$ mixed salt liquid electrolyte had the following composition: EC:PC (2:1;w:w), LiBOB (0.5M), LiBF$_4$ (0.5M)

(b) Composition of Gels

A typical LiBF$_4$ gel has the following composition:

30% Solvay PVDF 1015: 70% (EC:PC (2:1;w:w), LiBF$_4$ (1.0M))

A LiBOB, LiBF$_4$ mixed salt gel had the following composition:

30% Solvay PVDF 1015: 70% (EC:PC (2:1;w:w), LiBOB (0.5M), LiBF$_4$ (0.5M))

The PVDF typically used is Solvay Solexis PVDF Solef 1015 with molecular weight distribution: $M_n$ 238×10$^3$, $M_w$ 573×10$^3$ (polydispersity 2.4).

(c) Composition of Electrodes

Typical electrode compositions are:

Cathode
- Containing at least 90% of C10N Lithium Cobalt Oxide
- Containing at least 2.5% of Denka Black
- Containing at least 2.5% of 6020 PVDF
- Coat weight 190-240 grams per square meter to give a capacity of about 3.0 mAh/cm$^2$
- The PVDF typically used is Solvay Solexis PVDF Solef 6020 with molecular weight distribution: $M_n$ 310×10$^3$, $M_w$ 700×10$^3$ (polydispersity 2.4).

Anode
- At least 80% of MCMB graphite
- At least 9% of SFG44 carbon
- At least 3% of 6020 PVDF
- Coat weight 100-125 grams per square meter to give a capacity of 3.3 mAh/cm$^2$ (2) Polymer Gel Electrolyte Cell Construction (i) Overview of Extrusion Lamination Facility A single continuous process is used to produce a robust laminated cell. The proto-type apparatus used for the development of the work comprises a Twin-screw extruder which leads into a Single-screw extruder to make and extrude the PGE as a molten film at elevated temperature followed by a laminating heated roller system to laminate the resulting molten PGE between two electrodes. The Twin-screw extruder is required for intimate mixing of the PVDF powder (fed from a powder hopper) and the liquid electrolyte (fed using the primary peristaltic pump) to make the PGE. Whilst such extruders provide excellent mixing, they are notoriously poor pressure generators. The Single-screw crosshead extruder has been incorporated to generate the pressure necessary for consistent extrusion of PGE.

The PGE is extruded in a dry atmosphere through a contoured die in the form of a thin viscous tape. The electrodes are pre-wetted with the electrolyte by means of a second peristaltic pump. This fluid feed pre-wetting ensures that no gas is trapped between the electrolyte and the electrodes during lamination. The extrudate is laid onto one of the pre-wetted electrode foils initially and is eventually laminated between both prewetted electrodes on passing through the nip. On emerging from the haul-off, the gel is allowed to cool, forming a semi-flexible, strongly bonded laminate. A strip of battery material is produced continuously and this is then cut into shorter lengths of about 20 cm in situ or wound up on to a geared reel re-winder from Alpha Converting with central core diameter of about 15.2 cm. These sections of laminate are sealed inside foil-poly bag material inside the dry environment (to protect them from long-term exposure to moisture) and are then ready for testing.

(ii) Details of the Mixing, Extrusion and Lamination Apparatus

Figure 3:
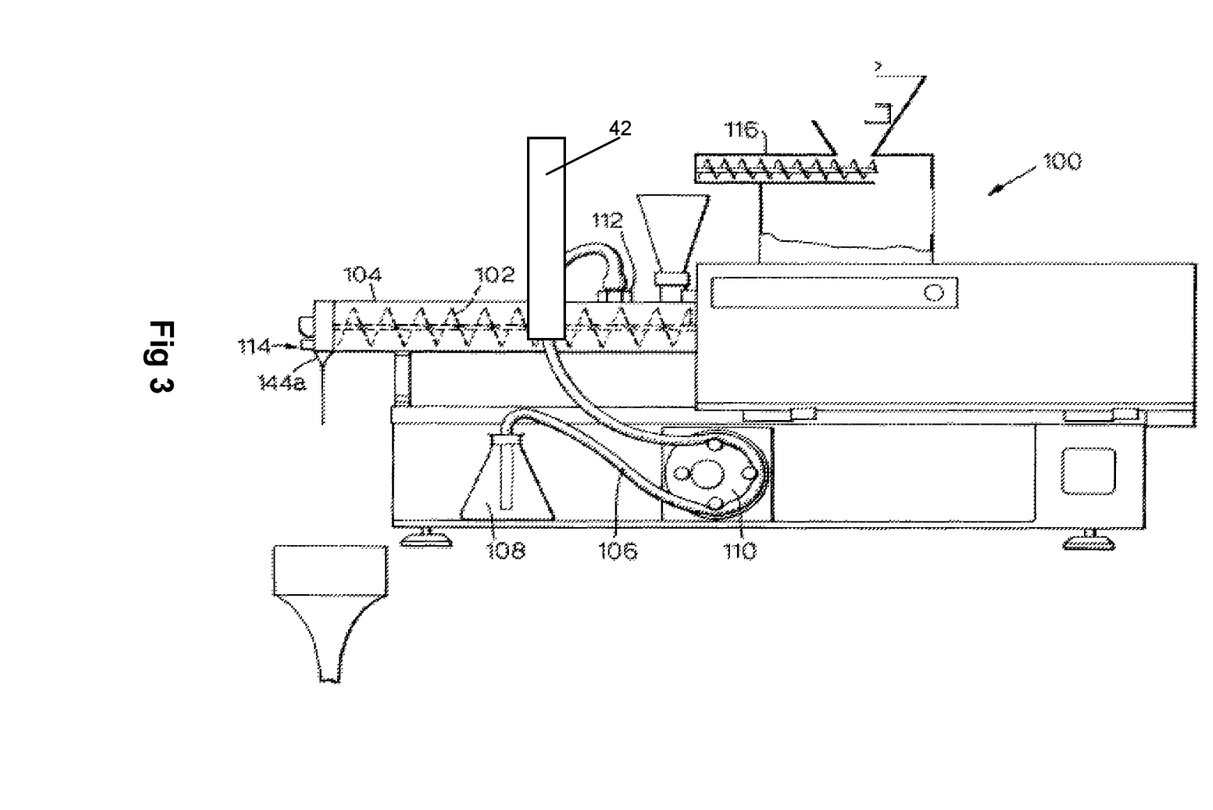
FIG. 3 is a diagrammatic representation of a screw mixer and extrusion apparatus suitable for use with the present invention.
Figure 4:
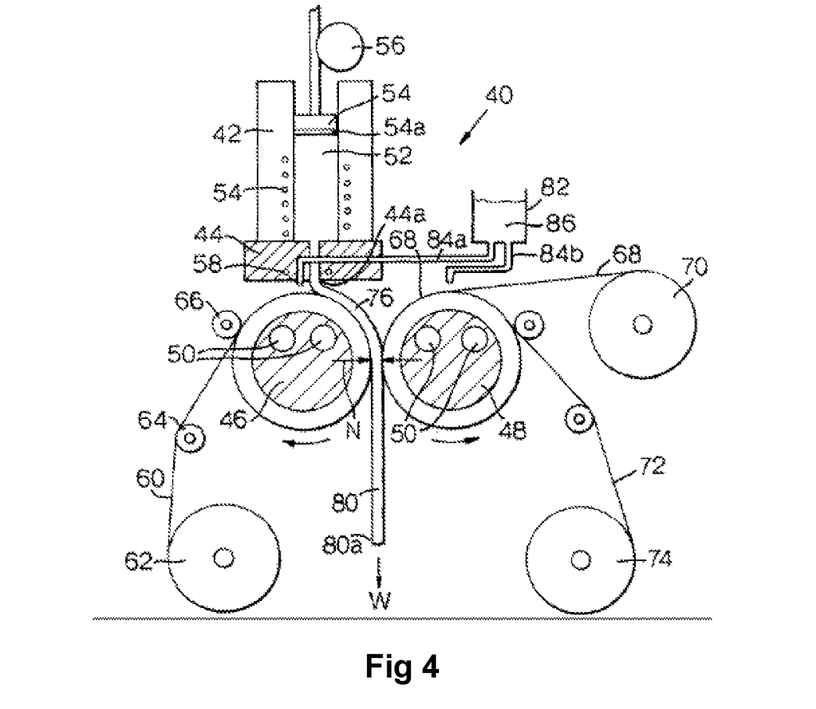
FIGS. 4 and 5 are detailed view of an extrusion and lamination station suitable for use with the present invention.
Figure 5:
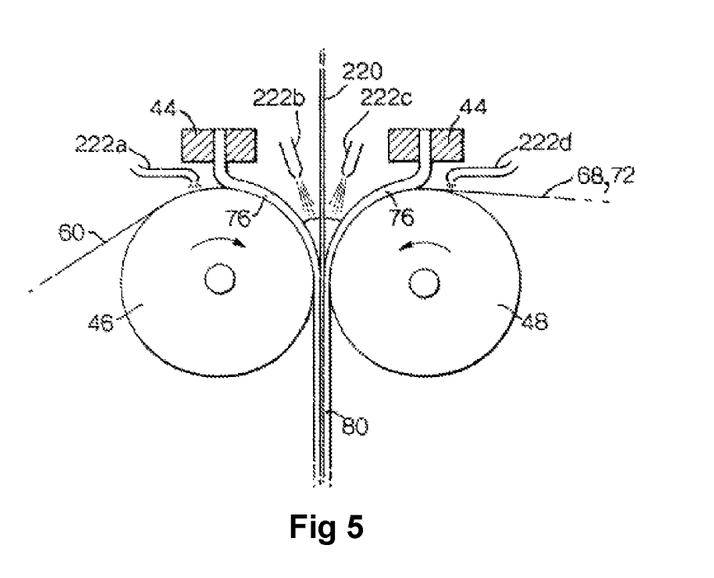

Referring now to FIGS. 3 to 5, a screw feeder 102 is employed to feed pre-mixed gel components along barrel 104 and force it from defined die outlet 144*a* at one end thereof. The outlet 144*a* is as described with reference to FIG. 4, as is the heated roller arrangement which, for brevity, is not repeated. Of note is the injection arrangement 106 comprising, for example, a reservoir of solvent 108, a peristaltic pump 110 and an injection nozzle 112. In this particular arrangement the injection point is at the beginning of the screw feed but injection may take place at any point along the screw or even at point 114 adjacent the outlet 144*a*. A further component of FIG. 3 comprises an optional controlled MF powder feeder 116 which may be a gravimetric feeder in an industrial scale process. FIG. 3 also introduces a high pressure ram extruder 42, best seen in FIG. 4.

The extrusion/lamination apparatus 40 of FIGS. 4 and 5 consists of a heated ram extruder 42, die 44 and heated lamination rollers 46, 48 having heaters 50 provided therein. The ram extruder barrel 52 is heated by means of heating coils 54 to the melt temperature of the gel and the rate of extrusion is controlled by a piston 55 driven by a motor 56 at a controlled rate. The piston is of stainless steel with an anti extrusion PTFE face 54a to prevent bleed back. From the ram, the gel passes through the die slot 44a, of pre-defined width and thickness, heated by heater 58 to a temperature slightly lower than that of the melt. The temperature difference between the die 44 and melt is chosen in order to better control the extrudate through the "nip" between the rollers. The cathode foil 60 is led from the foil storage roll 60 over a guide roller 64 under a spring loaded foil grip 66 onto the first heated roller 46. The second electrode 68 (anode on copper foil narrower than the cathode) is formed by combining a copper foil 68 from a supply roll 70 with a backing of plain aluminium foil 72 from a supply roller 74. The aluminium foil is 40 mm wide and fed clear from the third storage roller 74 in order to prevent excess gel from clogging the nip rollers 46, 48. The extruded melt 76 from the die 44 in the form of a thin molten film, layers onto the first electrode 60 on the first heated roller 46 placed very close to the die exit. The anode from storage roll 70 together with the aluminium foil backing strip 72 is brought via the second heated roller 48 to a nip N (defined as the gap between rollers 46, 48) where the whole assembly is laminated together by the compression created with the nip. The final laminate 80 hangs from below the nip into a collection tube (not shown). A drip cup 82 with two capillary tubes 84a, 84b applies optional solvent 86 (possibly that used for making the gel) onto the electrodes 60, 72 immediately prior to lamination to ensure full "pre-wetting" of the electrode foils and the removal of trapped gas.

Prior to lamination, equipment, components and materials are entered into the dry chamber while it is being purged with nitrogen. It will be appreciated that the lamination process need not take place immediately and, in some circumstances the gel may be wound onto a former for later lamination. The electrodes 60, 68 on the storage rolls 62, 70 together with the aluminium backing strip 72 are fed onto the heated rollers 46, 48 and through to the nip N. The foil ends 80a are clamped together and a small predefined weight (W) provides tension through the nip. The size of the nip will vary depending on the finished article but a gap of 300 microns has been found to be appropriate for the product outlined herein. The ram barrel, die and heated rollers are set to the required temperature. The ram extrusion rate and roller rate are preset. Solvent liquid is placed ready for entering the drip cups to "pre-wet" the electrodes. The die face is cleaned with release spray, dry tissue and the die slot scraped with thin piece of copper exactly fitting the die slot. Finally the gel is entered into the barrel of the extruder and allowed to reach a stable melt temperature.

Typical preset processing parameters are (example values): melt temperature 130° C., die temperature 130° C., roller temperature 95° C., die exit to first roller distance 6 mm, die slot dimension of between 25 μm and 250 μm by 100 mm width; the Nip dimension depends on the thickness of the electrodes and lies between 150-750 microns; roll speed 2 to 10 m/min, foil tension 100 g minimum, "pre-wet" drip feed rate 10 mil/min.

Some characteristics of the Twin Compounding Screw system are: low pressure extrusion; throughput independent of screw rpm; short dwell times; very good mixing of powdered polymer, particularly PVDF and solvent and no back leakage of solvent; suitable for feeding our slot die designs and for table mounting to feed extrudate on to heated rolls and electrode foil and nip system. Extrusion of salted gels will be easier than unsalted gels due to the increase in viscosity of the mixture caused by the addition of salt.

(iii) Preparation of Materials

We describe the procedures used for the preparation of cells and the calibration of the equipment as a set of instructions that are to be followed by an operator/s.

The polymer powder typically polyvinylidene difluoride (PVDF) 1015/1001D, Campagne 3026, Solvay is used as supplied from the drum. Drying at 100° C. is optional but can lead to problems with static and variable feed rates.

The electrolytes of composition as described in section 1 are battery grade electrolyte materials purchased from Novolyte Technologies. Individual components are mixed together by magnetic stirring at room temperature in a nitrogen-filled glove box (operating at drier than −40° C.).

The electrodes of composition as described in section 1(c), may be single or double sided, precoated foils 50 mm wide as described above and are used as supplied. They are prepared as detailed in (iv) below.

The backing foil is aluminium alloy 1200, soft temper, 9 cm width, 25 microns thickness, inner diameter 76 mm flush card, outer diameter 14 cm, Multifoil UK Ltd.

(iv) Preparing and Loading the Electrodes

Typically the electrodes are single or double-sided, pre-coated foils 50 mm wide as described above.

The anode is pre-dried at 140° C. for 10 hours in a vacuum desiccator and tap arrangement, which is inside a vacuum oven. The oven is then allowed to cool to room temperature and nitrogen is purged into the oven and desiccator to atmospheric pressure. The oven door is opened quickly, the desiccator tap shut down smartly and the desiccator is transferred to the extruder glove box. The cathode is pre-dried in an identical manner to the anode but at a temperature of 130° C. for 5 hours. Ideally, the extruder should be housed inside a dry room facility, however, it was discovered that it was sufficient to simply enclose the die slot and laminating roller system in a dry box unit maintained at drier than −40° C. dewpoint using pre-dried air from a Domnick Hunter DAS 1 membrane drier. The electrodes and the backing foils, pre-wound onto cardboard rolls, are fed via guides over heated rollers through the "nip".

(v) Preparation of Equipment a) For 50 micron gel thickness laminates, the die slot is set to 50 microns using stainless steel shims, the slot width is 100 mm and for single-sided electrodes of anode thickness 100 microns and cathode thickness 100 microns, the nip gap between the two heated rollers is set to 290 microns at 95° C.

b) On the main instrument control panel, switch on barrel heaters for the twin-screw and the single screw to allow them to warm up for at least 30 minutes.

c) The dry box is constantly purged with dry air at about −40° C. dewpoint from a DAS1 membrane drier available from Domnick Hunter Ltd.

d) The amount of powder must not fall below 2 kg level during processing and should be topped up approximately every 20 minutes. This will ensure a reasonably constant feed rate for the powder.

e) Switch on the heated rollers on the laminator to 95° C. and allow warming to take place—this takes about 20 minutes.
f) The electrolyte is calibrated to produce a throughput of 14 g/minute
g) The PVDF is calibrated to produce a throughput of 6 g/minute (vi) Startup Procedure and Continuous Processing a) Once the extruders have reached their preset temperatures, set the single-screw speed to 3.5 and the twin-screw speed to 2.0.
b) Turn on the Brabender feed (already set to about 3.7, depending on the calibration adjustment) and immediately turn on the electrolyte feed rate on the pump (already set to about 5.75 rpm, depending on the calibration adjustment).
c) After 5 minutes or so (the residence time of material in the extruder under these conditions) molten gel should extrude out of the bottom of the single screw and will spill on to a waste collection tray situated over the heated rollers. The gel should be forced through the die with sufficient pressure (about 60 Bar) for it to self-clean the die and form into the correct symmetrical shape in which the width reduces slightly on going from die to nip (this is called "necking" and is a common feature of molten polymer systems). This process should give a constant gel throughput of approximately 20 g/minute and the pressure transducer reading will climb steadily to about 60 Bar. The gel throughput is not varied during the course of the procedure.
d) The heated rollers on the laminator should now be stabilised at 95° C.
e) Turn on the speed of the haul-off roller to 5.0 (arbitrary units) and the heated rollers to 3.5 (arbitrary units). Check that electrodes and backing foils are being pulled through the nip smoothly and evenly.
f) Remove the waste collection tray and wind up the whole laminator to its preset end-stop position by holding the up button on the laminator motor (takes 20 seconds maximum). Gel tape of the same width as the anode will be deposited onto the anode continuously and will be laminated between the anode and cathode as it passes through the nip.
g) Once the backing foils and electrodes are being pulled through smoothly and evenly, the haul-off speed may be increased gradually to full speed (10.0 on the dial) at the same time as increasing the heated roller speed to about 9.5. Approximate calibrations have been done and the value of the dial unit corresponds roughly to the actual rate in meters/minute (i.e. 10.0 on the dial is approximately giving a speed of 10 meters/minute.)
h) Start up the second peristaltic pump for the fluid feed at a rate of 20 rpm on the dial.
i) As the laminate passes below the haul-off mechanism it is cooled by a gentle liquid nitrogen purge from a Statebourne Cryogenics Dewar maintained at 0.5 bar overpressure. The cool laminate is cut with scissors to lengths of about 20 cm or wound up on to a geared reel rewinder system and sealed in a foil-poly bag by a heat-sealing device, ready for removal and subsequent testing.

(3) Cell Handling, Tagging and Packaging

The polymer gel electrolyte laminate cells were tabbed using nickel and aluminium tabs with a polymer attachment (to seal between the edges of the foil bag) using ultrasonic welding. The assembly was then placed under vacuum and heat sealed. The packaged unit cells were tested for dc resistance, open circuit voltage and then impedance spectroscopy before they were tested for cycling performance using an Arbin battery tester.

(4) Outline of the Test Procedure

Tagged and packaged cells were tested on an Arbin battery tester.

A typical charge-discharge current used was a rate of about C/7 (complete discharge in 7 hours) which is 15 mA for a cell of capacity 105 mAh.

The typical test program used on the Arbin battery tester is:

1. Charge from 2.75V-4.2V at 15 mA Constant Current (~C/7)
2. Trickle charge for 2 hours
3. Leave at charge for 24 hours (with no current feed), measure open circuit voltage every 10 minutes.
4. Discharge at 15 mA (~C/7) to 2.75V
5. Charge from 2.75-4.2V at 15 mA
6. Discharge at 15 mA (~C/7) to 2.75V
7. Repeat steps 5-6 eight or more times Test temperature was maintained at 20° C. by carrying out the procedure in a temperature-controlled environment.

(5) Typical Results

Figure 2:
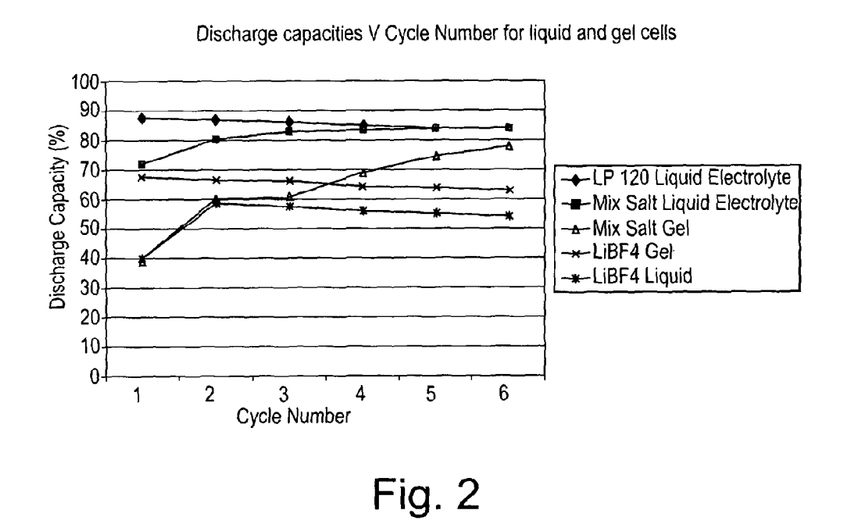
FIG. 2 shows the results of a series of discharge capacity measurements for various cell compositions.

FIG. 2 shows discharge capacities of liquid and gel electrolytes with cycle number. LP120 is a standard liquid electrolyte of composition EC:EMC (1:1): $LiPF_6$ (1.0M)

EXAMPLE 1

A polymer gel electrolyte (PGE) cell composition 30% PVDF: 70% (EC:PC (2:1;w:w), LiBOB (0.5M), $LiBF_4$ (0.5M)) was prepared by extrusion lamination between two electrodes of anode and cathode foils. The cell was tabbed, packaged and tested for discharge capacity vs cycle no. The results were compared with the results of four other samples prepared by a similar method.

Composition of the Materials (a) Electrolytes

The LiBOB, $LiBF_4$ mixed salt polymer gel electrolyte had the following composition: 30% Solvay PVDF 1015: 70% (EC:PC (2:1;w:w), LiBOB (0.5M), $LiBF_4$ (0.5M))

The $LiBF_4$ polymer gel electrolyte had the following composition:

30% Solvay PVDF 1015: 70% (EC:PC (2:1;w:w), $LiBF_4$ (1.0M))

The LiBOB, $LiBF_4$ mixed salt liquid electrolyte had the following composition: EC:PC (2:1;w:w), LiBOB (0.5M), $LiBF_4$ (0.5M)

The $LiBF_4$ single salt liquid electrolyte had the following composition: EC:PC (2:1;w:w), $LiBF_4$ (1.0M)

The LP120 standard electrolyte solution was EC:EMC (1:1;w:w), $LiPF_6$ (1.0M)

(b) Electrodes

Cathode

The cathode contained 91.2% C10N Lithium Cobalt Oxide; 2.8% of Denka Black; 6% of Solvay PVDF 6020. The coat weight was 230 grams per square meter giving a capacity of about 3.0 $mAh/cm^2$ Anode The anode was 83.7% of MCMB graphite; 9% of SFG44 carbon and 7% of Solvay PVDF 6020

Coat weight 100-125 grams per square meter to give a capacity of 3.3 $mAh/cm^2$

The electrodes were patch coated at a calendaring temperature of 120° C. as follows: 10 cm patch with 2 cm gap and slit to 40 mm wide and wound on to 76 mm ID cores.

Polymer Gel Electrolyte (PGE) Cell Construction
Preparation of Materials

Materials were prepared as described in (2)(iii) "Preparation of materials".

The polymer powder Solvay PVDF 1015 was used as supplied from the drum.

The electrolytes of composition described above were prepared from battery grade electrolyte materials purchased from Novolyte Technologies. The individual components were mixed together by magnetic stirring at room temperature in a nitrogen-filled glove box (operating at drier than −40° C.).

The backing foil was aluminium alloy 1200, soft temper, 9 cm width, 25 microns thickness, inner diameter 76 mm flush card, outer diameter 14 cm, Multifoil UK Ltd.

Preparing and Loading the Electrodes

The single-sided electrodes were prepared as described in (2)(iv) above "Preparing and loading the electrodes". The anode was pre-dried at 140° C. for 10 hours and the cathode at 130° C. for 5 hours.

Preparation the Equipment and Cell Fabrication Using the Extrusion Lamination Process The equipment was prepared and polymer gel cells fabricated using the extrusion lamination process as described in (2)(v) above "Preparation of Equipment" and (2)(vi) "Startup Procedure and Continuous Processing"

For the run to fabricate the mixed salt polymer gel electrolyte cells containing LiBOB:$LiBF_4$ and EC:PC, the die slot was set to 95 microns, and the slot width is 100 mm. Using single-sided electrodes of anode thickness 92 microns and cathode thickness 88 microns, the nip gap between the two heated rollers was set to 300 microns at 95° C. The target gel thickness was 70 microns. The electrolyte pump delivered at 14.4 g/minute; The PVDF powder feed delivered at 6.15 g/minute. The die temperature was set 130° C. The lamination roller speed was 3 m/min. A fluid feed of mixed salt electrolyte $LiBF_4$ (0.5M), LiBOB (0.5M) EC:PC (2:1) (ingredients from Novolyte) was used throughout the lamination with electrodes. The electrolyte made up in a glove box at dewpoint of −72° C. The Glove box dewpoint for lamination was −40° C.

The Resulting Laminates

A laminate of enough cell material for approximately 50 cells was made in the single run of the extrusion-lamination process. Cells produced were measured for thickness using a digital micrometer and showed a gel thickness of 80 microns. Preliminary dc resistance readings on the laminates using an Avometer showed a high resistance of 0.7M ohms, which is indicative of no gross shorts.

Cell Handling, Tagging and Packaging

The polymer gel electrolyte laminate cells were tagged and packaged as described in (3) "Cell handling, tagging and packaging".

The gel cells were tabbed using nickel and aluminium tabs with a polymer attachment (to seal between the edges of the foil bag) using ultrasonic welding. The assembly was then placed under vacuum and heat sealed. The packaged unit cells were tested for dc resistance, open circuit voltage and then impedance spectroscopy before they were tested for cycling performance using an Arbin battery tester.

The liquid cells were tabbed using nickel and aluminium tabs with a polymer attachment (to seal between the edges of the foil bag) using ultrasonic welding. None of the electrolytes wetted the Tonen or Celgard separator materials available, so it was decided to use glass microfiber filter paper (GFA, Catalogue number 1820-150 from Whatman) as a separator between the electrodes. When this was completed, the tabbed unit was placed inside a foil poly bag. 8 mls of electrolyte was pipetted into the cell and the cell massaged gently by hand to ensure complete wetting of the filter paper and electrodes. The assembly was then placed under vacuum and heat sealed. The packaged unit cells were tested for dc resistance, open circuit voltage and then impedance spectroscopy before they were tested for cycling performance using an Arbin battery tester.

Outline of the Test Procedure

The cells were tested as described in (4) "Outline of the test procedure"

The tagged and packaged cells were tested on an Arbin battery tester.

A typical charge-discharge current used was a rate of about C/7 (complete discharge in 7 hours) which is 15 mA for a cell of capacity 105 mAh.

The test program used on the Arbin battery tester was:
1. Charge from 2.75V-4.2V at 15 mA Constant Current (~C/7)
2. Trickle charge for 2 hours
3. Leave at charge for 24 hours (with no current feed), measure open circuit voltage every 10 minutes.
4. Discharge at 15 mA (~C/7) to 2.75V
5. Charge from 2.75-4.2V at 15 mA
6. Discharge at 15 mA (~C/7) to 2.75V
7. Repeat steps 5-6 eight or more times Test temperature was maintained at 20° C. by carrying out the procedure in a temperature-controlled environment.

Results

FIG. 2 shows discharge capacities of gel and liquid electrolytes with cycle number for the cells composed of various electrolytes.

LP120 Liquid Electrolyte is a standard liquid electrolyte of composition EC:EMC (1:1): $LiPF_6$ (1.0M).

The Mixed Salt Liquid Electrolyte is: EC:PC (2:1;w:w), LiBOB (0.5M), $LiBF_4$ (0.5M)

The Mixed Salt Gel is: 30% Solvay PVDF 1015: 70% (EC:PC (2:1;w:w), LiBOB (0.5M), $LiBF_4$ (0.5M))

The $LiBF_4$ Gel is 30% Solvay PVDF 1015: 70% (EC:PC (2:1;w:w), $LiBF_4$ (1.0M))

The $LiBF_4$ Liquid is EC:PC (2:1;w:w), $LiBF_4$ (1.0M)

The results are also tabled below:

TABLE 1

Discharge capacities (%) versus cycle number for liquid and gel electrolytes.

| Cycle Number | LP 120 Liquid Electrolyte | Mixed Salt Liquid Electrolyte | Mixed Salt Gel | $LiBF_4$ Gel | $LiBF_4$ Liquid |
|---|---|---|---|---|---|
| 2 | 87.8 | 71.7 | 38.7 | 67.8 | 39.9 |
| 3 | 87.1 | 80.3 | 59.9 | 66.8 | 58.8 |
| 4 | 86.0 | 82.7 | 61.0 | 65.4 | 57.5 |
| 5 | 85.4 | 83.4 | 68.5 | 64.3 | 56.2 |
| 6 | 83.7 | 83.7 | 74.8 | 63.4 | 55.0 |
| 7 | 83.7 | 83.7 | 77.8 | 62.8 | 54.1 |

It can be seen that after 5 cycles there is a clear electrochemical advantage in terms of increased cell capacity by the addition of LiBOB to cells containing the polymer gel electrolyte or the liquid electrolyte.

The invention claimed is:
1. An electrolyte component containing one or more salts including lithium bis(oxalate)borate (LiBOB), a solvent, propylene carbonate (PC) and a crystallisable polymer wherein said LiBOB is present as a weight percentage of 0.5% or more and the crystallisable polymer is present at a weight percentage of greater than 1% and comprising a mixed LiBOB, LiBF$_4$ mixed salt liquid electrolyte having the following composition: EC:PC (2:1;w:w), LiBOB (0.5M), LiBF$_4$ (0.5M).

2. An electrolyte component as claimed in claim 1 and further comprising a polyvinylidene fluoride (PVDF).

3. An electrolyte component as claimed in claim 1 wherein the composition comprises: up to 30% PVDF: up to 70% (EC:PC (2:1;w:w), LiBOB (0.5M), LiBF$_4$ (0.5M)).

4. An electrolyte component as claimed in claim 1 and including a non-crystallisable polymer such as Poly(methyl methacrylate) (PMMA).

5. An electrolyte component as claimed in claim 1 and comprising two or more crystallisable polymers.

6. An electrolyte component as claimed in claim 1 wherein the electrolyte component further comprises an anion, and wherein said anion is selected from the group consisting of SCN$^-$, ClO$_4^-$, HgI$_3^-$, BF$_4^-$, CF$_3$COO$^-$, CF3SO$_3^-$, PF$_6^-$, AsF$_6^-$, [N(SO$_2$CF$_3$)$_2$]$^-$, [N(SO$_2$CF$_2$CF$_3$)$_2$.

7. A galvanic cell having an electrolyte component as claimed in claim 1.

8. A galvanic cell having an electrolyte component as claimed in claim 7 and comprising an anode and a cathode and having an electrolyte component as claimed in claim 1.

9. A galvanic cell having an electrolyte component as claimed in claim 1 and comprising a cathode comprising layered oxides, lithium metal oxides, LiMO$_2$ (M=Co, Ni, Mn), LiMn$_2$O$_4$, lithium metal phosphates, LiFePO$_4$, Li$_3$M$_2$(PO$_4$)$_3$, LiVPO$_4$F, or lithium metal sulphates, LiFeSO$_4$F, LiMnSO$_4$F, Li$_2$FeSiO$_4$, Li$_2$MnSiO$_4$.

10. A method of producing a laminated electrical component as claimed in claim 1 comprising the steps of:
   i) mixing and heating polymer(s), solvent(s) in a mixing apparatus to form a homogeneous melt material;
   ii) forming the melt material as an elongated tape of desired width and depth;
   iii) contacting the tape from step (ii) with an electrode material at a temperature at which the tape, at least at the contact surface, is in the liquid phase;
   iv) simultaneously or sequentially with step (iii) compressing the electrode material and mixture whereby an elongated laminated composite is formed; and
   v) adding a salt to the material either during the or subsequent to step (i).

11. A method as claimed in claim 10 and in which the homogeneous melt material is formed from polymer and solvent without salt and that prior to contact of the mixture, whether in liquid or gel form, with the electrode material, an electrolyte solution including LiBOB is applied to one or more of the surfaces to be contacted.

12. A method as claimed in claim 10 and in which prior to contact of the mixture, whether in liquid or gel form, with the electrode material, an electrolyte solution including LiPF$_6$ is applied to one or more of the surfaces to be contacted.

* * * * *